United States Patent
Saito et al.

(10) Patent No.: US 8,555,694 B2
(45) Date of Patent: Oct. 15, 2013

(54) BENDING APPARATUS AND BENDING MACHINE

(76) Inventors: Masaki Saito, Okazaki (JP); Shingo Hashimoto, Okazaki (JP); Fumio Shindo, Nishio (JP)

( * ) Notice: Subject to any disclaimer, the term of this patent is extended or adjusted under 35 U.S.C. 154(b) by 535 days.

(21) Appl. No.: 12/641,739

(22) Filed: Dec. 18, 2009

(65) Prior Publication Data

US 2010/0170317 A1 Jul. 8, 2010

(30) Foreign Application Priority Data

Jan. 8, 2009 (JP) .................................. 2009-002187

(51) Int. Cl.
*B21D 5/02* (2006.01)
*B21D 11/00* (2006.01)
*B21D 9/05* (2006.01)

(52) U.S. Cl.
USPC .................................. 72/380; 72/307; 72/387

(58) Field of Classification Search
USPC ........... 72/298, 306, 307, 310, 380, 386, 387, 72/388
See application file for complete search history.

(56) References Cited

U.S. PATENT DOCUMENTS

| | | | | |
|---|---|---|---|---|
| 674,574 | A * | 5/1901 | Decrette | 72/298 |
| 996,064 | A * | 6/1911 | Costello | 72/298 |
| 1,268,844 | A * | 6/1918 | Holinger | 72/220 |
| 2,316,049 | A * | 4/1943 | Connor | 72/298 |
| 3,452,786 | A * | 7/1969 | Lund et al. | 140/92.1 |
| 3,832,879 | A * | 9/1974 | Holden | 72/383 |
| 3,888,101 | A * | 6/1975 | Crees | 72/388 |
| 4,056,960 | A * | 11/1977 | Kawanami | 72/128 |
| 4,411,148 | A * | 10/1983 | Aschauer et al. | 72/306 |
| 4,873,877 | A * | 10/1989 | Harris | 73/864.16 |
| 4,945,619 | A * | 8/1990 | Bayer | 29/33 R |
| 6,951,054 | B2 * | 10/2005 | Hirota et al. | 29/596 |
| 2004/0040142 | A1 | 3/2004 | Hirota et al. | |
| 2005/0150268 | A1 | 7/2005 | Coop | |
| 2006/0005376 | A1 | 1/2006 | Hirota et al. | |
| 2007/0101793 | A1* | 5/2007 | Gruber | 72/310 |

FOREIGN PATENT DOCUMENTS

| | | |
|---|---|---|
| DE | 20309207 U1 | 9/2003 |
| JP | 55-122924 U | 9/1980 |
| JP | 1-258818 A | 10/1989 |
| JP | 2004-104841 A | 4/2004 |
| JP | 2006-271121 A | 10/2006 |

OTHER PUBLICATIONS

German Office Action issued Oct. 19, 2011 for corresponding German Application No. 112009002299.5.

* cited by examiner

*Primary Examiner* — Dana Ross
*Assistant Examiner* — Lawrence Averick
(74) *Attorney, Agent, or Firm* — Sughrue Mion, PLLC

(57) ABSTRACT

A bending apparatus for performing accurate non-destructive bending of material includes first and second jigs that are rotatable about a rotary shaft and that bend the material attached to the jigs as they rotate relative to each other. The first jig includes a bending section that is arranged offset from a rotary center to a rotating side of the material and that has a partially cylindrical surface with a radius of curvature corresponding to the radius of curvature of an inner peripheral surface of the material. Each of the first and second jigs has a suppressing section for suppressing displacement of the material, and a bending center of the material is arranged such that the material is not displaced relative to the first and second jigs when the material is bent.

8 Claims, 15 Drawing Sheets

FIG. 7A
FIG. 7B
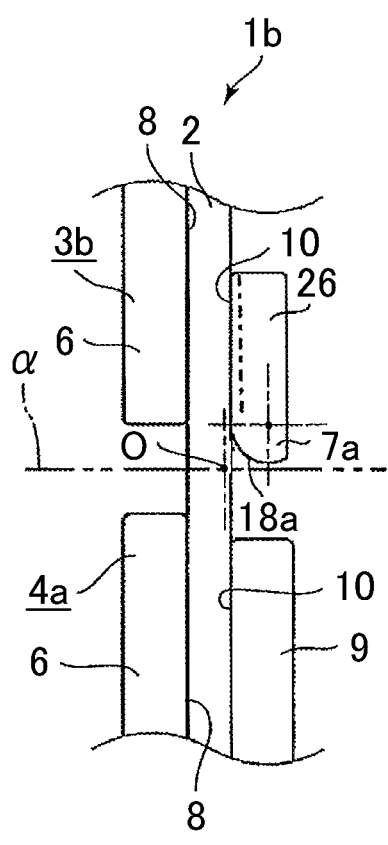
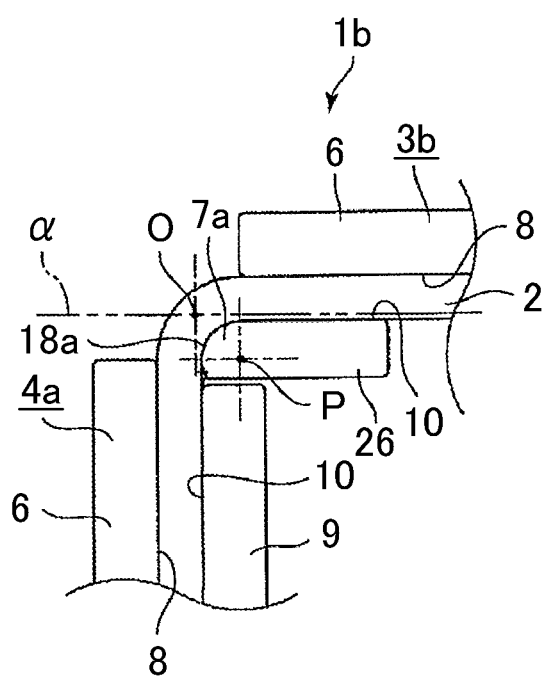

FIG. 9A
FIG. 9B
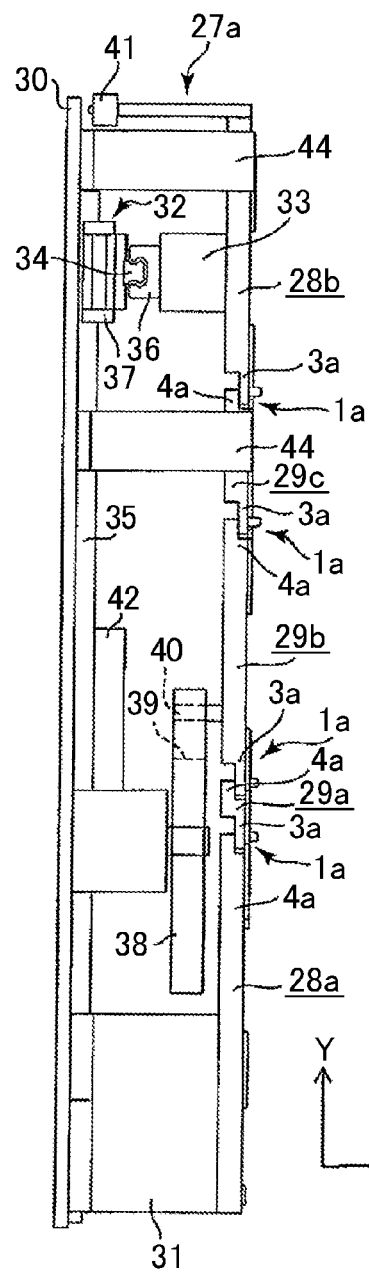
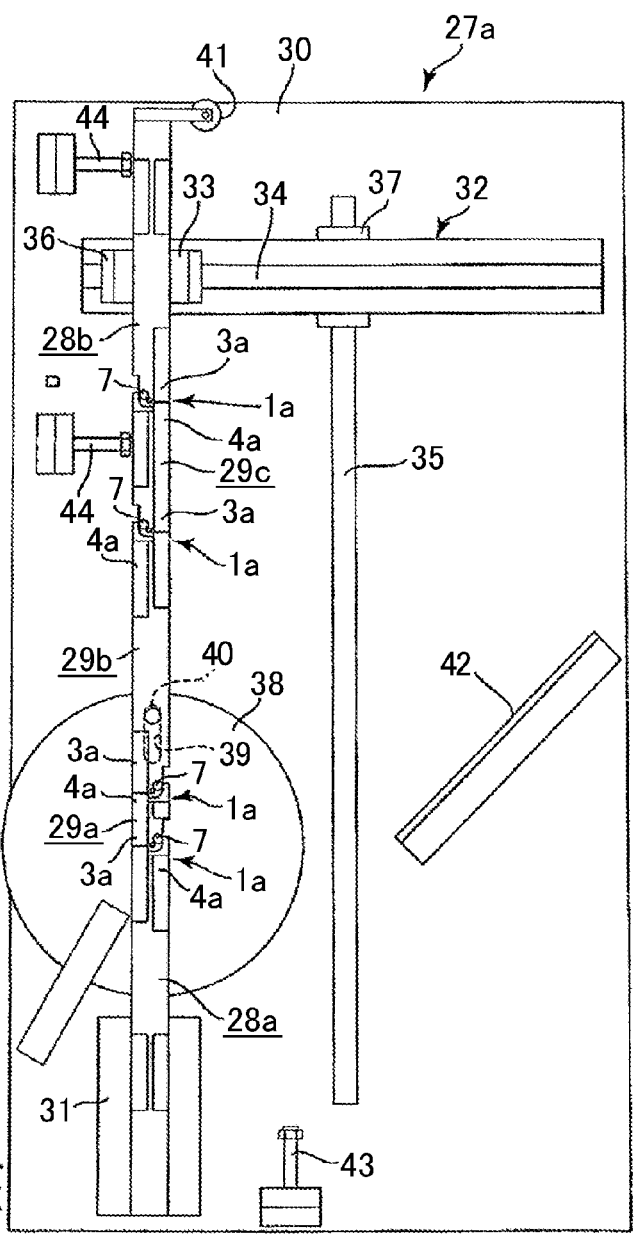

F I G . 13
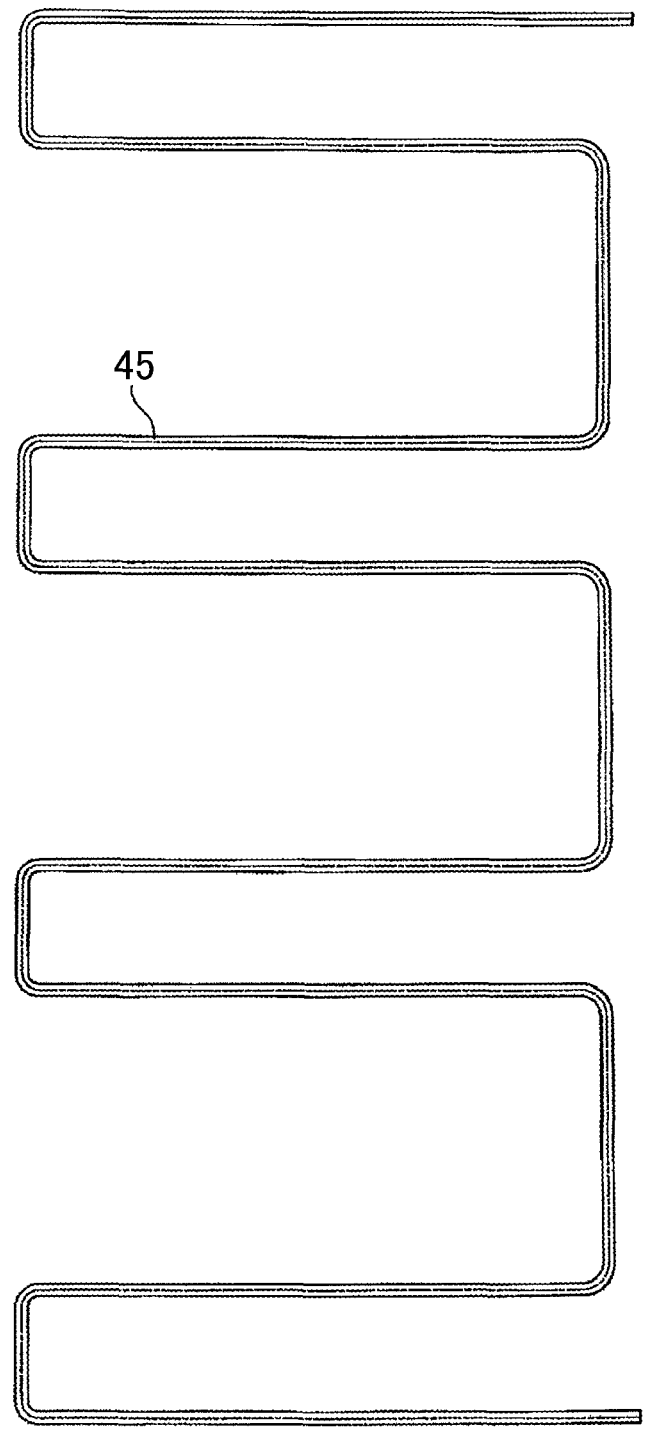

BENDING APPARATUS AND BENDING MACHINE

INCORPORATION BY REFERENCE

The disclosure of Japanese Patent Application No. 2009-002187 filed on Jan. 8, 2009 including the specification, drawings and abstract is incorporated herein by reference in its entirety.

BACKGROUND OF THE INVENTION

The present invention relates to a bending apparatus and a bending machine that bends a prescribed material, such as metal wires having a circular or rectangular cross section for forming motor coils (e.g. a flat rectangular wire), or rods, pipes, plates and the like. Particularly, the present invention relates to a bending apparatus and a bending machine that can perform bending of the material accurately by eliminating pull-in of the material that may occur when the material is bent.

DESCRIPTION OF THE RELATED ART

Generally, motor coils and the like are obtained by bending of a material, such as a metal, wire by winding the material around a bending jig. In related art, a method has been proposed in Japanese Patent Application Publication JP-A-2006-271121 in which the bending jig is rotated on the material, whereby the material is wound around the bending jig. Further, a method has been proposed in Japanese Patent Application Publication JP-A-2004-104841 in which one of the jigs is rotated at a position coinciding with the bending center of the material, whereby the material is wound around the other jig. A method has been proposed in Japanese Utility Model Application Publication JP-A-55-122924 in which, when the material is bent simultaneously at two portions, the material is fixed at two portions by clamps, and then bent while being pulled.

SUMMARY OF THE INVENTION

With the structure described in Japanese Patent Application Publication JP-A-2006-271121, when bending is performed, the bending jig needs be rotated and moved along the material in a state where an end of the material is fixed to the bending jig. As a result, the required mechanism is complicated and may not be capable of performing an accurate bending.

With the structure described in Japanese Patent Application Publication JP-A-2004-104841, since the bending center of the material and the rotary center of the jigs coincide with each other, the material is displaced relative to either one of the jigs during the bending (i.e., the material is pulled in). Such pull-in of the material is described referring to FIGS. 15A and 15B. In a bending apparatus 1 shown in FIGS. 15A and 15B, first and second jigs 3 and 4 are arranged respectively on either sides of a portion of a material 2 to be bent. Then, as shown in the states from FIG. 15A to FIG. 15B, the jigs 3 and 4 are relatively rotated about a rotary shaft 5, so that bending of the material 2 is performed. In the structure shown in FIGS. 15A and 15B, the rotary center of the jigs 3 and 4 and the bending center of the material 2 coincide with each other. Additionally, the material 2 is fixed to the second jig 4 so that the material cannot be displaced. As a result, during the bending, the material 2 is displaced relative to the first jig 3 by the amount the material 2 is bent along the outer peripheral surface of the rotary shaft 5. Then, as shown in the states from FIG. 15A to FIG. 15B, an amount of the end of the material 2 protruding from the end surface of the first jig 3 is reduced (i.e., pull-in).

As described in the foregoing, when the material 2 is displaced relative to the first jig 3 when the bending is performed, the material 2 and the first jig 3 may be scraped against each other, and as a result the material 2 may be damaged. Additionally, as described above, when the material 2 is displaced relative to the first jig 3 when the bending is performed, it is difficult to combine a plurality of bending apparatuses to bend the material 2 simultaneously at a plurality of portions.

On the other hand, with the structure described in Japanese Utility Model Application Publication JP-A-55-122924, the material is bent simultaneously at two portions. The bending centers of the material and the rotary center are offset relative to each other, while both cramps fixing the material are coupled slidably in the direction away from each other. Then, exerting a bending force and tensility (a back tension) to the both cramps, the material 2 is bent at the two portions. Here, a great amount of back tension must be exerted in the direction in which the clamps are away from each other so that the material is not pulled in. Accordingly, it is difficult to control the dimension of the material when performing the bending, and it is difficult to perform the bending accurately.

In light of the foregoing, it is an object of the present invention to provide a bending apparatus and a bending machine that are capable of performing accurate bending of a material such as a metal wire, preventing the material from being pulled in when the bending is performed, and preventing any damage to the material when the material is bent, and further, capable of achieving an excellent bending accuracy even when the material is simultaneously bent at a plurality of portions.

The present invention (see FIGS. 1A, 1B 2A, 2B, 2C, 7A and 7B, for example) relates to a bending apparatus that includes a first jig and a second jig coupled so as to be rotatable about a rotary shaft, and that bends a prescribed material attached to the first jig and the second jig as the first and second jigs rotate relatively to each other. In the bending apparatus, the first jig has a suppressing section that is arranged on a side opposite to a rotating direction and suppresses a displacement of the material, and a bending section that is arranged offset by a prescribed amount from a rotary center to a rotating side of the material, and has a partially cylindrical surface having a radius of curvature substantially identical with a radius of curvature of an inner peripheral surface of the material at least after the bending of the material, the second jig has a suppressing section that is arranged on the side opposite to the rotating direction and suppresses the displacement of the material, and a bending center of the material is arranged at a position deviated from the rotary center of the first and second jigs toward the rotating side so that the material is not displaced relative to the first and second jigs when the material is bent.

For example, referring to FIGS. 1A, 1B, 2A, 2B, 2C, 3, 4A, 4B, 6A, 6B, 6C, 6D, 6E, 7A and 7B, the bending section moves so that the bending section before the bending is positioned on a first jig side relative to a perpendicular line that is perpendicular to the first jig and the second jig in a linear state and passes through the rotary center, and the bending section after the bending is positioned on a second jig side relative to the perpendicular line.

For example, referring to FIG. 4, the bending center of the material is arranged at a position satisfying expressions:

$$X = (R + W \times a) \times \theta/2 / \tan(\theta/2)$$

$$Y = (R + W \times a) \times \theta/2$$

$$0 < \theta \leq \pi/2$$

where $\theta$ is a bending angle of the material; W is a thickness or diameter of the material; a is a ratio of a distance between a neutral line of the material and the inner peripheral surface of the material after the bending of the material to W; R is a radius of curvature of a cylindrical surface of the bending section; and of a distance from the bending center to the rotary center of the first and second jigs (3a, 3b and 4a), X is a distance related to a direction perpendicular to a linear direction assuming that a state of the material before the material is bent in a bending direction is linear, and Y is a distance related to a direction parallel to the linear direction based on the same assumption.

For example, referring to FIGS. 1 to 4, 6 and 7, the prescribed material is a flat rectangular wire forming a motor coil.

The present invention (see FIGS. 8 to 12, for example) relates to a bending machine in which a plurality of the bending apparatuses are arranged in series by coupling the first jigs and the second jigs alternately at the rotary centers, so as to bend the prescribed material at a plurality of portions.

For example, referring to FIGS. 9 to 12, the bending machine further includes: a base; a fixed attachment member fixed to the base; a slider mechanism movable in an X direction and a Y direction perpendicular to each other on a plane parallel to a surface of the base; and a movable attachment member provided at a movable portion of the slider mechanism. In the bending machine, five jigs are arranged in series by coupling the first jigs and the second jigs alternately. One of the five jigs arranged in series, which is located at one end thereof, is attached to the fixed attachment member, and one of the five jigs arranged in series, which is located at the other end thereof, is attached to the movable attachment member. The jig at the other end is moved in the X and Y directions while being kept oriented in the same direction before and after the bending, so that the material is bent simultaneously at four portions.

For example, referring to FIGS. 9 to 12, the material (2) is bent by applying a bending force to one of the five jigs arranged in series, which is located in the middle.

For example, referring to FIGS. 9 to 12, the fixed attachment member is arranged so that the jig at the one end is attached to be oriented in the Y direction, the movable attachment member is arranged so that the jig at the other end is attached to be oriented in the Y direction, and the material is bent by 90 degrees each.

According to the invention according to a first aspect of the present invention, for performing bending of a material, the first and second jigs are rotated relative to each other with the bending section offset by a prescribed amount from the rotary center. Therefore, while the bending mechanism is simple, the bending can be achieved accurately. Further, since the material is not displaced relative to the first and second jigs during the bending, the material and the jigs can be prevented from being scraped against each other, and therefore any damage to the material can be avoided.

According to the invention according to a second aspect of the present invention, when bending is performed, the bending section is relatively moved so as to cross over a perpendicular line that is perpendicular to the linearly arranged first and second jigs and that passes the rotary center. Therefore, the bending that can avoid scraping between the material and the jigs can smoothly be performed.

According to the invention according to a third aspect of the present invention, the material can surely be prevented from being pulled in.

According to the invention according to a fourth aspect of the present invention, bending of a flat rectangular wire can accurately be performed without damaging an insulating enamel layer during the bending. Therefore, motor coils of an excellent quality can be obtained.

According to the invention according to a fifth aspect of the present invention, the material can be bent simultaneously at a plurality of portions. Therefore, complicated bending shapes can be achieved accurately and in a short time, thereby reducing the manufacturing costs. Specifically, according to the bending apparatus according to the first to fourth aspects, the material is prevented from being pulled in during the bending. Therefore, even when a plurality of the bending apparatuses are combined as in the invention according to the fifth aspect and the material is bent simultaneously at a plurality of portions, the material is not be pulled in. Hence, even when the material is bent simultaneously at a plurality of portions, the dimension of the material is not changed, and therefore complicated bending shapes can be achieved accurately and in a short time. Still further, when motor coils are manufactured based on the invention according to the fifth aspect, the number of joining portions of the coils can be reduced. Hence, the manufacturing costs can be reduced and the size of the coils can be reduced.

According to the invention according to a sixth aspect of the present invention, the material can be bent simultaneously at four portions accurately and easily.

According to the invention according to a seventh aspect of the present invention, the material can be bent simultaneously at the four portions further efficiently.

According to the invention according to an eighth aspect of the present invention, the material can be accurately and easily bent by 90 degrees each.

BRIEF DESCRIPTION OF THE DRAWINGS

FIG. 2A is an elevation view showing a state before bending, FIG. 2B is a right side view of FIG. 2A in the same state, and FIG. 2C is an elevation view showing a state after the bending;

FIGS. 7A and 7B are partial schematic diagrams of a bending apparatus according to a second embodiment of the present invention in an elevation view, respectively showing a state before bending and a state after the bending;

FIGS. 9A and 9B show the bending machine according to the third embodiment before bending; FIG. 9A is a side view, and FIG. 9B is an elevation view;

FIG. 13 shows a coil element obtained by the bending machine according to the present invention;

DETAILED DESCRIPTION OF THE EMBODIMENTS

First Embodiment

Figure 1A:
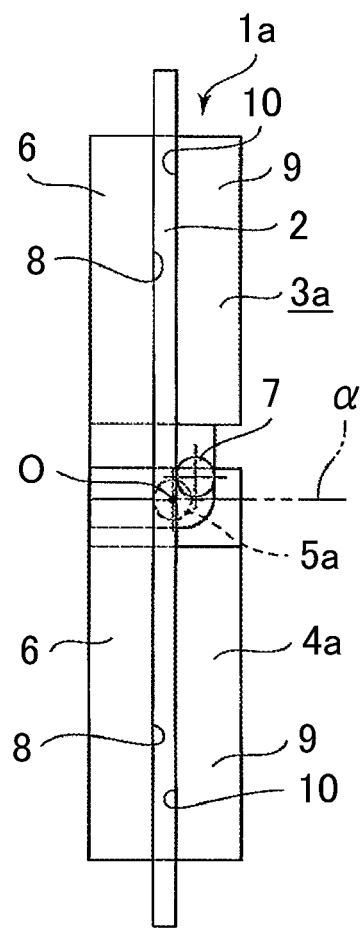
FIGS. 1A and 1B are schematic diagrams of a bending apparatus according to a first embodiment of the present invention in an elevation view as seen from an axial direction of a rotary shaft, respectively showing a state before bending and a state after the bending.

In the following, referring to FIGS. 1 to 6, a first embodiment of the present invention will be described.

First, an overview of a bending apparatus 1a of the present embodiment is described referring to a schematic diagram of FIG. 1. The bending apparatus 1a is structured with first and second jigs 3a and 4a that are coupled by a rotary shaft 5a so as to be rotatable relatively to each other. The first jig 3a includes a suppressing section 6, a bending section 7, and a holding section 9. The suppressing section 6 is arranged on the side opposite to the rotating direction of a material 2, e.g., a flat rectangular wire having a rectangular cross section, in a state where the material 2 is arranged at the first jig 3a. In the state where the material 2 is so arranged, a suppressing surface 8 of the suppressing section 6 abuts on the material 2.

The bending section 7 is formed to have a cylindrical outer peripheral surface, and the center of which is arranged at a position offset by a prescribed amount from a rotary center O of the rotary shaft 5a to the rotating side of the material 2. In the state where the material 2 is so arranged, the outer peripheral surface of the bending section 7 abuts on a side surface of the material 2 on the rotating side, and the material 2 is held by and between the suppressing surface 8 of the suppressing section 6 and the outer peripheral surface of the bending section 7.

In the state where the material 2 is arranged at the first jig 3a, the holding section 9 is arranged on the opposite side to the suppressing section 6 with the material 2 being interposed therebetween (i.e., on the rotating side of the material 2). In the state where the material 2 is so arranged, the material 2 is auxiliary held by and between the suppressing surface 8 of the suppressing section 6 and a holding surface 10 of the holding section 9. It is to be noted that, as shown in FIG. 2 referred to in the later description, the holding section 9 may be omitted.

On the other hand, the second jig 4a includes a suppressing section 6 and a holding section 9 which are similar to those of the first jig 3a. However, the second jig 4a does not include any bending section 7, which is different from the first jig 3a. As the second jig 4a does not include any bending section 7, the material 2 is held in the second jig 4a by and between the suppressing surface 8 of the suppressing section 6 and the holding surface 10 of the holding section 9 only.

Figure 1B:
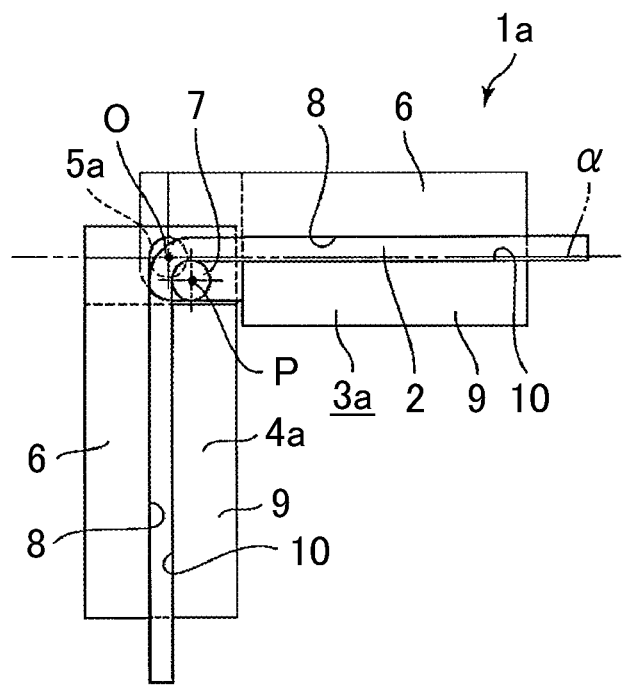

The first and second jigs 3a and 4a respectively structured as above are coupled via the rotary shaft 5a as described above, and are rotatable relatively to each other about the rotary center O of the rotary shaft 5a. When bending is performed, as shown from FIG. 1A showing the state before the rotation to FIG. 1B showing the state after the rotation, the bending section 7 fixed to the first jig 3a relatively moves so as to cross over a perpendicular line (a phantom line a) that is perpendicular to the linearly arranged jigs 3a and 4a and that passes the rotary center O, and the center thereof coincides with a bending center P of the material 2. The bending center P is arranged at a position offset by a prescribed amount from the rotary center O to the rotating side of the material 2.

Figure 2A:
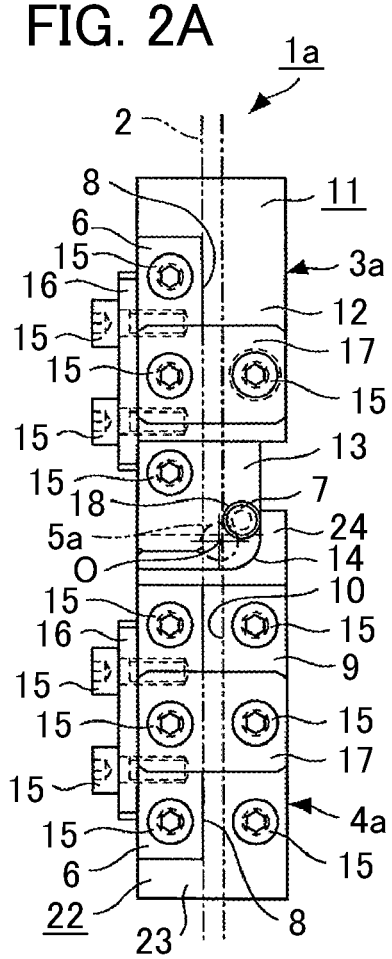
FIGS. 2A to 2C show the bending apparatus according to the first embodiment.
Figure 2B:
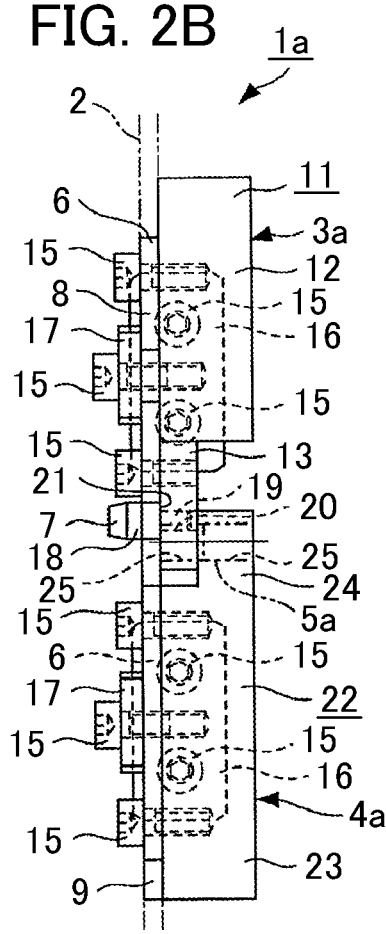
Figure 2C:
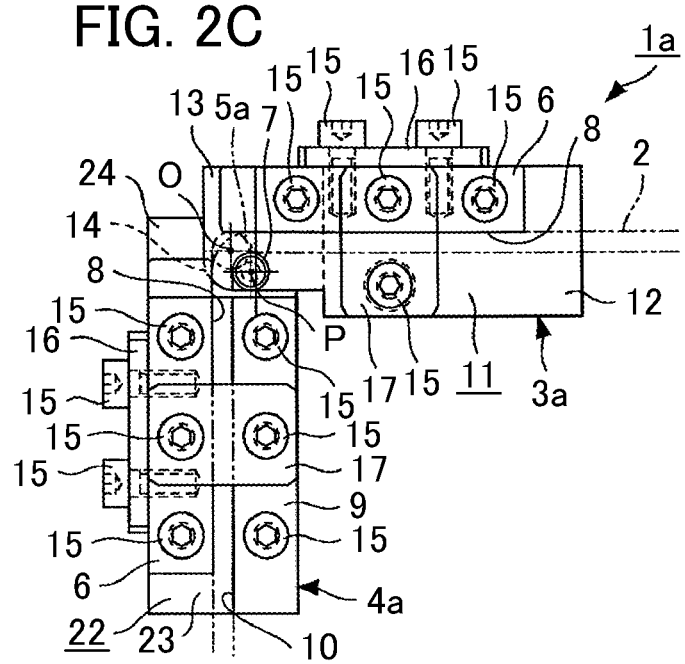

Next, details of the bending apparatus 1a according to the present embodiment is described referring to FIG. 2. In the structure shown in FIG. 2, the first jig 3a is structured by a first block 11 to which the suppressing section 6 and the bending section 7 are both fixed. The first block 11 is structured by a body portion 12 that extends from the top end to the middle part in top-bottom direction of FIG. 2A and FIG. 2B, and a projecting portion 13 that projects downwardly from a bottom end of the body portion 12 and whose thickness (the thickness in the right-left direction in FIG. 2B) is smaller than the thickness of the body portion 12. A side surface (on the right side in FIG. 2B) of the projecting portion 13 on the side opposite to the side on which the material 2 is arranged is recessed relative to the body portion 12, whereby the thickness of the projecting portion 13 is made smaller than that of the body portion 12. Accordingly, a side surface (on the left side in FIG. 2B) of the projecting portion 13 on the side on which the material 2 is arranged is located on the identical plane with the side surface of the body portion 12 on the side on which the material 2 is arranged.

The side surface on the rotating side (the right side surface in FIG. 2A) of the projecting portion 13 is recessed relative to the side surface of the body portion 12 on the rotating side. Also, a contiguous portion 14 between a bottom end surface of the projecting portion 13 and the side surface on the rotating side is formed partially cylindrically. Thus, the contiguous portion 14 of the projecting portion 13 is prevented from contacting the second jig 4a when the jigs 3a and 4a relatively rotate.

The suppressing section 6 is fixed to one surface of the first block 11 (the front side surface in FIG. 2A; the left side surface in FIG. 2B) by bolts 15 and 15. Also, a positioning plate 16 is fixed by bolts 15 and 15 to the side (the left side in FIG. 2A; the rear side in FIG. 2B) opposite to the rotating side of the first block 11, so that the side surface of the positioning plate 16 abuts on a side edge portion, opposite to the rotating side, of the suppressing section 6. Thus, on the one surface of the first block 11, the suppressing section 6 is positioned in relation to the direction perpendicular to the material 2 (the right-left direction in FIG. 2A).

At a position facing an intermediate part of the one side of the first block 11, an anti-loose plate 17 is fixed with the material 2 being interposed. The anti-loose plate 17 is arranged to cross over the material 2, and opposing ends of the anti-loose plate 17 are fixed to the first block 11 by bolts 15 and 15. One of the opposing ends is fixed via the suppressing section 6. Thus, in a state where the material 2 is arranged, the material 2 is held by and between the anti-loose plate 17 and the first block 11, thereby preventing the material 2 from being displaced in the perpendicular direction in FIG. 2A and the right-left direction in FIG. 2B.

The bending section 7 is shaped as a substantially-stepped column, and provided at the middle part with a bending cylindrical surface 18 having a cylindrical surface of a large diameter, and at the base end part (the right end part in FIG. 2B) a fitting section 19 having a cylindrical surface of a small diameter. It is also noted that a tip part (the left end part in FIG. 2B) of the bending section 7 has an outer peripheral surface of a partially conical surface. The radius of curvature of the bending cylindrical surface 18 is approximately the same as that of the inner peripheral surface of the material 2 after bending.

The bending section 7 formed as above has the fitting section 19 fitted into and fixed to a fitting hole 20 formed in the projecting portion 13 of the first block 11. The fitting hole 20 is formed to penetrate through the thickness of the projecting portion 13 at a position offset by a prescribed amount from the rotary center O of the rotary shaft 5a to the rotating side. In a state where the fitting section 19 fitted into the fitting hole 20, a step portion 21 formed between the bending cylindrical surface 18 and the fitting section 19 abuts on the one side surface of the projecting portion 13. In the state where the material 2 is arranged at the first jig 3a, the bending cylindrical surface 18 of the bending section 7 abuts on the side surface of the material 2. Then, the material 2 is held by and between the suppressing surface 8 of the suppressing section 6 and the bending cylindrical surface 18.

On the other hand, the second jig 4a is structured by a second block 22 to which the suppressing section 6 and the holding section 9 are both fixed. The second block 22 is structured by a body portion 23 extending from the bottom end to the middle part in the top-bottom direction of FIG. 2A and FIG. 2B, and a projecting portion 24 that projects upwardly from the top end of the body portion 23 and whose thickness (the thickness in the right-left direction in FIG. 2B) is smaller than that of the body portion 23. A side surface (on the left side in FIG. 2B) of the projecting portion 24 on the side on which the material 2 is arranged is recessed relative to the body portion 23, whereby the thickness of the projecting portion 24 is made smaller than that of the body portion 23. It is to be noted that the recess amount is approximately the same as the thickness of the projecting portion 13 of the first block 11.

The suppressing section 6 is fixed to one surface of the second block 22 (the front side surface in FIG. 2A; the left side surface in FIG. 2B) by bolts 15 and 15. Also, a positioning plate 16 is fixed by bolts 15 and 15 to the side (the left side in FIG. 2A; the rear side in FIG. 2B) opposite to the rotating side of the second block 22, so that the side surface of the positioning plate 16 abuts on a side edge portion of the suppressing section 6 on the opposite side to the rotating side. Thus, on the one surface of the second block 22, the suppressing section 6 is positioned in relation to the direction perpendicular to the material 2 (the right-left direction in FIG. 2A).

The holding section 9 is fixed to one surface of the second block 22 by bolts 15 and 15 on the side (i.e., the rotating side) opposite to the suppressing section 6 with the material 2 being interposed therebetween. In a state where the material 2 is arranged at the second jig 4a, the material 2 is held by and between the suppressing surface 8 of the suppressing section 6 and the holding surface 10 of the holding section 9.

At a position facing an intermediate part of the one side of the second block 22, an anti-loose plate 17 is fixed with the material 2 being interposed. The anti-loose plate 17 is arranged to cross over the material 2, and opposing ends of the anti-loose plate 17 are fixed to the second block 22 via the suppressing section 6 and the holding section 9 by bolts 15 and 15. Thus, in a state where the material 2 is arranged, the material 2 is held by and between the anti-loose plate 17 and the second block 22, thereby preventing the material 2 from being displaced in the perpendicular direction in FIG. 2A and the right-left direction in FIG. 2B.

The first and second jigs 3a and 4a structured as described above are coupled via the rotary shaft 5a. To this end, the projecting portion 13 of the first block 11 and the projecting portion 24 of the second block 22 overlap with each other as shown in FIG. 2, while aligning through holes 25 and 25, which are formed in the projecting portions 13 and 24, respectively. Then the rotary shaft 5a is fitted into the through holes 25 and 25. In this state, the one surface of the first block 11 on which the material 2 is arranged and the one surface of the second block 22 on which the material 2 is arranged are positioned on the identical plane.

The first and second jigs 3a and 4a are rotatable about the center axis of the rotary shaft 5a by, for example, fitting the rotary shaft 5a into one through hole 25 by the interference fit, and into the other through hole 25 by the clearance fit. In this case, it is preferable that the hole into which the rotary shaft 5a is fitted by the clearance fit be provided with an anti-loose unit for the rotary shaft 5a. Alternatively, the rotary shaft 5a may be fit into one through hole 25 by the interference fit, and may be fit into the other through hole 25 via a bearing. In any case, the first and second jigs 3a and 4a are rotatable relative to each other about the center axis (rotary center O) of the rotary shaft 5a. Similarly to the structure shown in FIG. 1, in the structure in FIG. 2 also, the bending section 7 moves from the state before rotation in FIG. 2A and FIG. 2B to the state after rotation in FIG. 2C.

When bending is performed, the material 2 is arranged at the first and second jigs 3a and 4a. Such an arrangement is carried out as follows, for example. First, at least one ends of the anti-loose plates 17 and 17 structuring the jigs 3a and 4a are both removed from the first and second blocks 11 and 22. Then, the material 2 is arranged between the suppressing section 6 and the bending section 7 structuring the first jig 3a, and between the suppressing section 6 and the holding section 9 structuring the second jig 4a. Next, the anti-loose plates 17 and 17 structuring the jigs 3a and 4a are attached to the first and second blocks 11 and 12. As a result, the material 2 is held by and between the blocks 11 and 12 and the anti-loose plates 17 and 17.

In the state where the material 2 is arranged at the jigs 3a and 4a, the first jig 3a is rotated relatively to the second jig 4a about the rotary shaft 5a. Here, the side surface of the material 2 on the side opposite to the rotating side abuts on the suppressing surfaces 8 of the suppressing sections 6 structuring the jigs 3a and 4a, whereby displacement of the material 2 in the direction counter to the rotating direction is suppressed. On the other hand, the bending section 7 moves from the state in FIG. 2A and FIG. 2B to the state in FIG. 2C.

Figure 3:
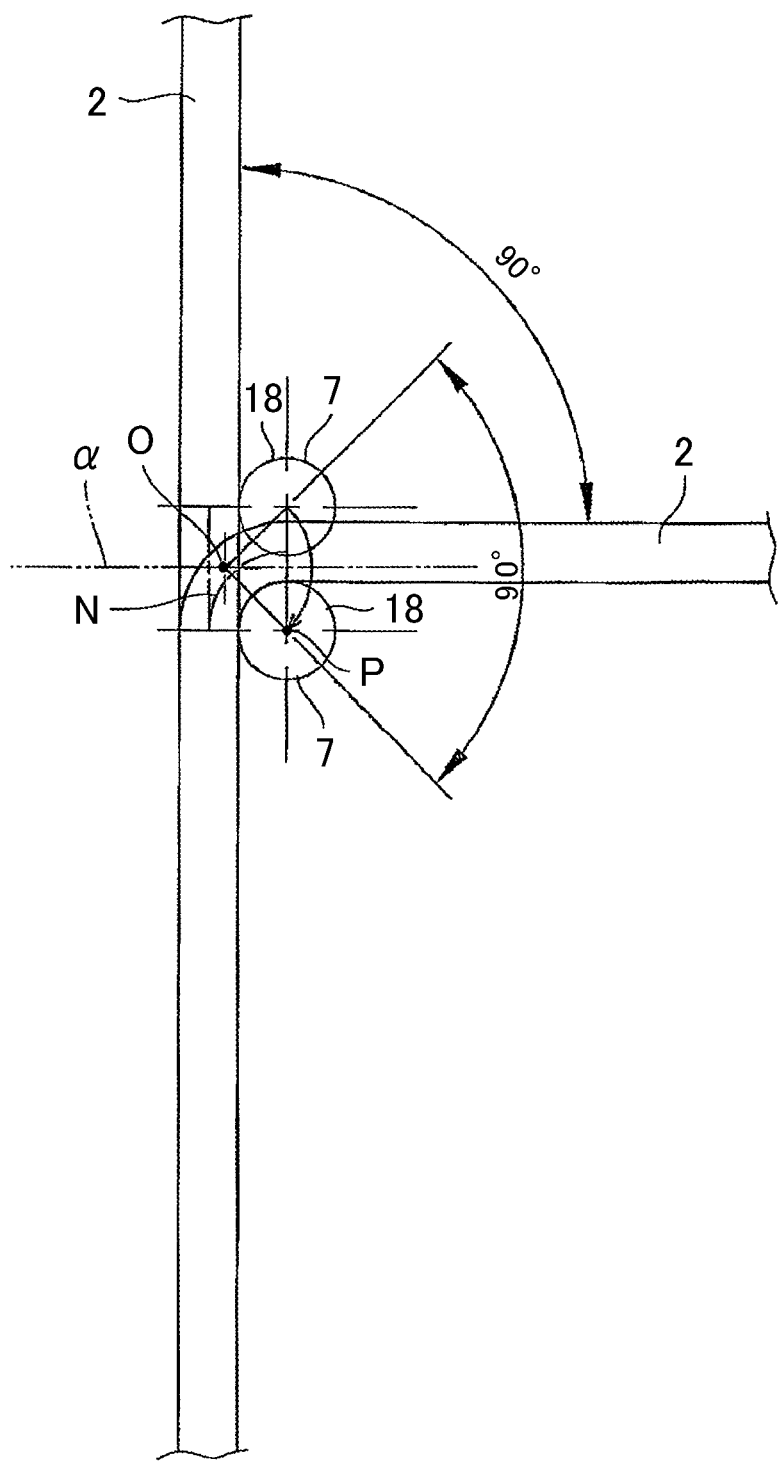
FIG. 3 is a schematic diagram showing a positional relationship between a material and a bending section before and after the bending.

Such movement of the bending section 7 is described referring to FIG. 3. FIG. 3 shows the positional relationship between the material 2 and the bending section 7 before and after the material 2 is bent by 90 degrees. In the case of the linear material 2, the bending section 7 before the bending is positioned on the first jig 3a side (the upper side in FIG. 3) relative to the phantom line α that passes the rotary center and is perpendicular to the material 2. During the bending, the bending section 7 moves with the first jig 3a in the rotating direction about the rotary center O. After the bending, the bending section 7 is positioned on the second jig 4a side (the lower side in FIG. 3) relative to the phantom line α. In this state, the center of curvature of the bending cylindrical surface 18 of the bending section 7 is located at the bending center P of the material 2. The bending center P is located at a position offset by a prescribed amount from the rotary center O to the rotating side of the material 2.

Figure 4A:
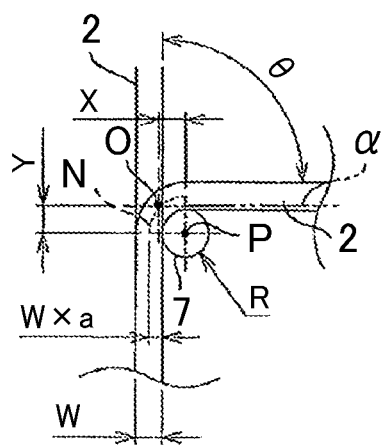
FIG. 4 is a schematic diagram for describing a relation between a bending center of the material and a rotary center.
Figure 4B:
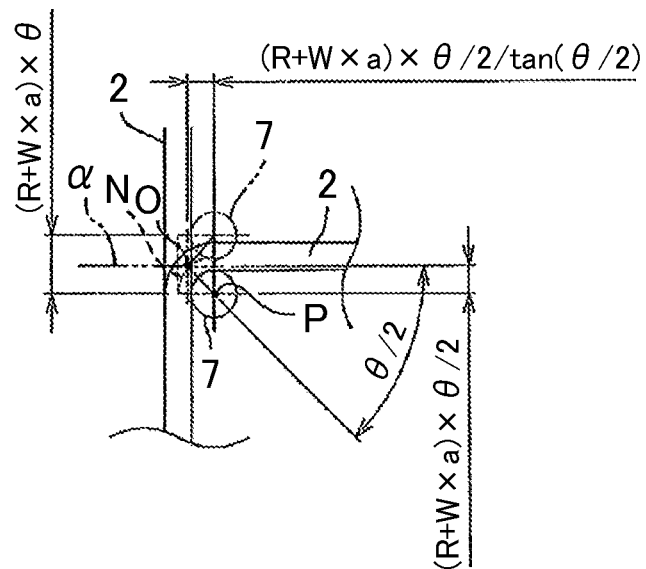
Figure 5A:
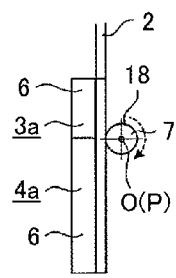
FIG. 5 is a schematic diagram sequentially showing the states where the material is bent with a structure in which the rotary center and the bending center coincide with each other.
Figure 5B:
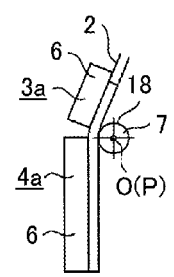
Figure 5C:
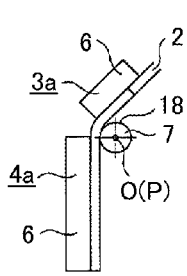
Figure 5D:
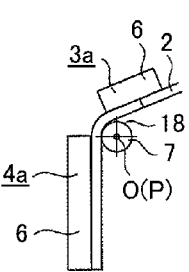
Figure 5E:
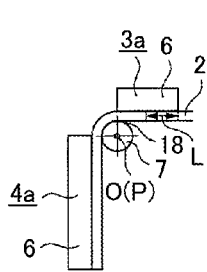
Figure 15A:
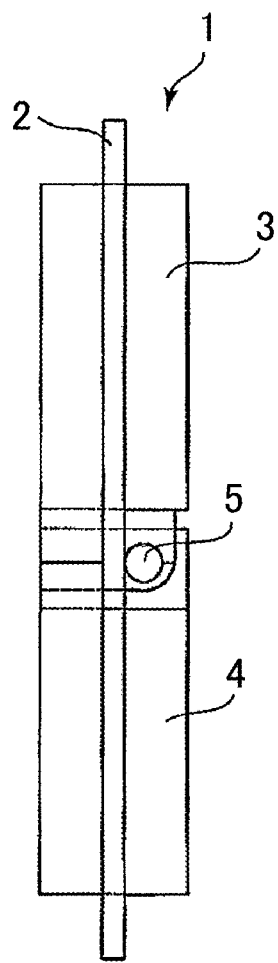
FIGS. 15A and 15B are schematic diagrams of an exemplary bending apparatus in which a rotary center and a bending center coincide with each other in an elevation view, respectively showing a state before bending and a state after the bending.
Figure 15B:
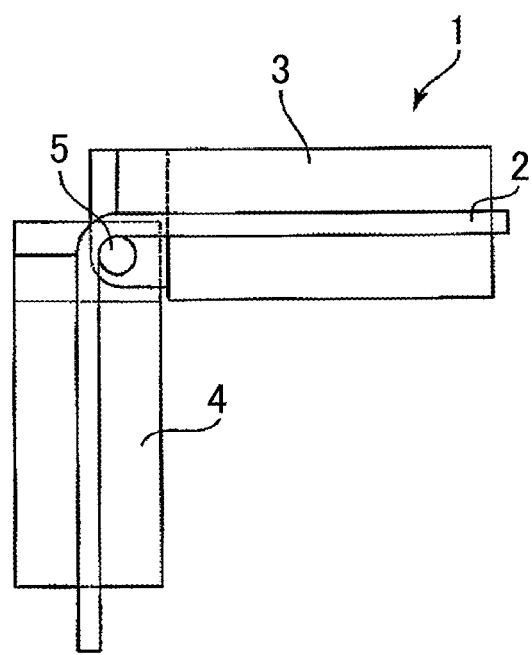

The relation between the bending center P and the rotary center O is described referring to FIG. 4. First, the values are defined as follows: the bending angle of the material 2 is θ; the thickness of the material 2 (the diameter when the material 2 has a circular cross section) is W; the ratio of the distance between a neutral line N of the material 2 and the inner peripheral surface of the material 2 after bending to W is a; the radius of curvature of the bending cylindrical surface 18 of the bending section 7 is R and; in the distance from the bending center P to the rotary center O, the distance related to the direction (X direction; the right-left direction in FIG. 4) perpendicular to the linear direction, assuming that the material 2 is linear before the material 2 is bent in the bending direction of the material 2, is X, and the distance related to the direction (Y direction; the top-bottom direction in FIG. 4) in parallel with the linear direction based on the same assumption is Y. Here, the bending center P is set at a position relative to the rotary center O satisfying the following expressions:

$X=(R+W\times a)\times\theta/2/\tan(\theta/2)$ $Y=(R+W\times a)\times\theta/2$ $0<\theta\leq\pi/2$ Now, the above expressions are described. First, as shown in FIG. 15 described above, when the material 2 is bent in a state where the bending center P and the rotary center O coincide with each other, the material 2 moves by $(R+W\times a)\times\theta$ on the neutral line N relative to the first jig 3a. That is, the material 2 is pulled in by the circumferential length of the bending part of the neutral line N. Accordingly, in order to prevent the material 2 from being pulled in during the bending, the bending section 7 may be moved along the material 2 by $(R+W\times a)\times\theta$ from the beginning to the end of the bending. As can be seen from FIG. 4, the X-direction distance of the bending section 7 is not changed before and after the bending and, therefore, the bending section 7 may be moved by $(R+W\times a)\times\theta$ in the Y direction. Since the bending section 7 is moved about the rotary center O, as can be seen from FIG. 4B, the distance between the bending center P and the rotary center O in the Y direction is half of the moving distance of the bending section 7, i.e., $(R+W\times a)\times\theta/2$.

Thus, if the distance of the bending center P from the rotary center O in the Y direction is obtained, then the distance in the X direction $(R+W\times a)\times\theta/2/\tan(\theta/2)$ can similarly be derived by trigonometric functions. It is to be noted that $0<\theta\leq\pi/2$ is so defined because, in the present embodiment, the material 2 cannot be prevented from being pulled in when the bending angle is defined to be greater than $\pi/2$.

According to the present embodiment described above, because the material 2 can be bent just by rotating the first and second jigs 3a and 4a relative to each other in a state where the bending section 7 is offset by a prescribed amount from the rotary center O, and therefore, the bending mechanism is simple. Accordingly, an accurate bending can easily be performed.

Furthermore, during the bending, the material 2 is not displaced relative to the first jig 3a. This is described referring to FIGS. 5 and 6. In FIGS. 5 and 6, the position of the material 2 corresponding to an end of the first jig 3a before bending is performed is marked up to show the moving amount of the marking relative to the first jig 3a during the bending. FIG. 5 shows the bending performed in a state where the rotary center O and the bending center P coincide with each other, while FIG. 6 shows the bending performed according to the present embodiment.

With the structure shown in FIG. 5, the material 2 is bent along the bending cylindrical surface 18 of the bending section 7. Here, as shown in FIG. 5A to FIG. 5E, the material 2 is displaced relative to the first jig 3a by the amount the material 2 deforms along the bending cylindrical surface 18 and, eventually, the material 2 is displaced relative to the first jig 3a by the length L shown in FIG. 5E. The value L corresponds to the $(R+W\times a)\times\theta$ described above. As described above, when the material 2 is bent and moves relative to the first jig 3a, the material 2 and the suppressing surface 8 of suppressing section 6 structuring the first jig 3a may be scraped against each other, resulting in damage to the material 2. It is to be noted that, FIG. 5 shows the structure in which the material 2 is fixed to avoid displacement of the material relative to the second jig 4a. If the material 2 can be displaced relative to the second jig 4a, the material 2 may be displaced also relative to the second jig 4a.

Figure 6A:
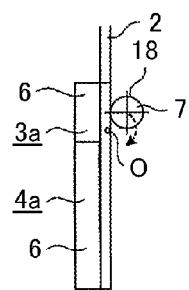
FIG. 6 is a schematic diagram sequentially showing the states where the material is bent according to the first embodiment.
Figure 6B:
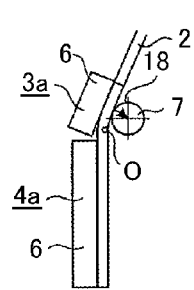
Figure 6C:
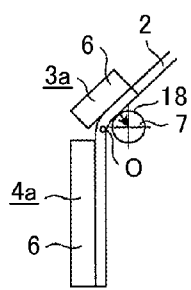
Figure 6D:
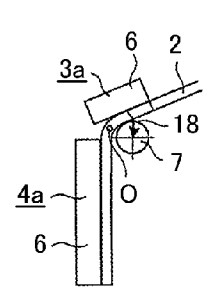
Figure 6E:
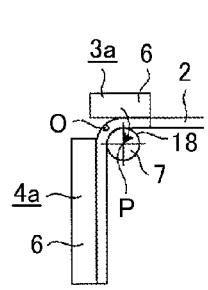

On the other hand, according to the present embodiment shown in FIG. 6, as seen from FIG. 6A to FIG. 6E, the bending section 7 rotates with the material 2 about the rotary center O. Then, as shown in FIG. 6E, the bending section 7 moves to the position where the center of curvature of the bending cylindrical surface 18 coincides with the bending center P. In the case according to the present embodiment, the bending center P is offset by a proper distance relative to the rotary center O and, therefore, the material 2 does not move relative to the first jig 3a as can be seen from FIG. 6E. As a result, the material 2 and the first jig 3a can be prevented from scraping against each other when the bending is performed, whereby any damage to the material 2 can be avoided. Furthermore, when the material 2 is a flat rectangular wire that forms motor coils, the motor coils of an excellent quality can be obtained since an insulating enamel layer will not be damaged during the bending.

While it has been described in the foregoing as to the case where the first jig 3a is rotated relative to the second jig 4a, the first jig 3a may be fixed and the second jig 4a may be rotated relative to the first jig 3a. In this case, the center of curvature of the bending cylindrical surface 18 of the bending section 7 structuring the first jig 3a becomes the bending center.

Second Embodiment

FIG. 7 shows a bending apparatus 1b according to a second embodiment of the present invention, in which the bending section 7 according to the first embodiment has a modified shape. In the following, description will be given mainly on the difference from the first embodiment.

As shown in FIG. 7, at a bending section 7a structuring a first jig 3b, a bending cylindrical surface 18a forming a quarter of a circle as seen from the perpendicular direction to the surface of FIG. 7 is formed on the tip surface of a rectangular portion 26 which is elongated along the axial direction of the material 2 and whose cross section perpendicular to the axial direction is rectangular. The bending cylindrical surface 18a is a partially cylindrical surface provided at a contiguous portion between the side surface of the bending section 7a on the material 2 side and the tip surface of the bending section 7a. A center axis (the axis passing through the center of curvature) of the bending cylindrical surface 18a passes perpendicularly to the surface of FIG. 7. According to the present embodiment, the material 2 is held by and between the side surface of the rectangular portion 26 and the suppressing section 6 structuring the first jig 3b. The positional relationship between the center of curvature of the bending cylindrical surface 18a and the rotary center O of the first and second jigs 3b and 4a is the same as in the first embodiment.

In the present embodiment, the rectangular portion 26 corresponds to the holding section 9 in FIG. 1. As a result, the holding section and the bending section can be structured by a single member and, therefore, the number of the elements can be reduced relative to the structure shown in FIG. 1, attaining further reduction in costs.

Third Embodiment

FIGS. 8 to 13 show a bending machine 27 according to a third embodiment of the present invention, structured by a combination of a plurality of bending apparatuses such as described above. Each of the bending apparatuses is structured similarly as in the first embodiment. First, an overview of the bending machine 27 according to the present embodiment is described referring to FIG. 8.

Figure 8A:
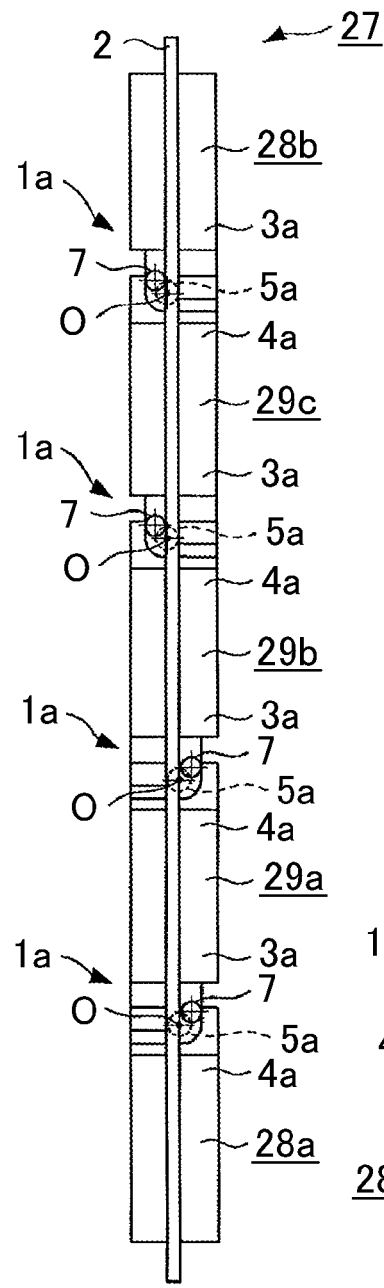
FIGS. 8A and 8B are schematic diagrams showing a bending machine according to a third embodiment of the present invention in an elevation view, respectively showing a state before bending and a state after the bending.

The bending machine 27 is structured by arranging a plurality of bending apparatuses 1*a* in series, by alternately coupling the first jigs 3*a* and the second jigs 4*a* at the rotary centers O, so that the material 2 can be bent at a plurality of portions. To this end, between a pair of end jigs 28*a* and 28*b*, three intermediate jigs 29*a*, 29*b* and 29*c* are arranged. Among them, the end jig 28*a* arranged on the bottom side in FIG. 8A is provided with the second jig 4*a* at one end (the top side in FIG. 8A). The end jig 28*b* arranged on the top side in FIG. 8A is provided with the first jig 3*a* at the other end (the bottom side in FIG. 8A).

The intermediate jigs 29*a*, 29*b* and 29*c* are each provided with both of the first jig 3*a* and the second jig 4*a* at the opposing ends. Here, the three intermediate jigs 29*a*, 29*b* and 29*c* are each provided with the first and second jigs 3*a* and 4*a* so that the rotating direction is changed at the intermediate jig 29*b* arranged in the middle of the three intermediate jigs 29*a*, 29*b* and 29*c*.

The jigs 28*a*, 28*b*, 29*a*, 29*b*, and 29*c* structured as above are coupled to one another at the first jigs 3*a* and the second jigs 4*a* via the rotary shafts 5*a*. That is, the second jig 4*a* of the end jig 28*a* and the first jig 3*a* of the intermediate jig 29*a* are coupled so that the intermediate jig 29*a* rotates relative to the end jig 28*a* in the clockwise direction in FIG. 8. Further, the second jig 4*a* of the intermediate jig 29*a* and the first jig 3*a* of the intermediate jig 29*b* are coupled so that the intermediate jig 29*b* rotates relative to the intermediate jig 29*a* in the clockwise direction in FIG. 8. Still further, the second jig 4*a* of the intermediate jig 29*b* and the first jig 3*a* of the intermediate jig 29*c* are coupled so that the intermediate jig 29*c* rotates relative to the intermediate jig 29*b* in the counter-clockwise direction in FIG. 8. Still further, the second jig 4*a* of the intermediate jig 29*c* and the first jig 3*a* of the end jig 28*b* are coupled so that the end jig 28*b* rotates relative to the intermediate jig 29*c* in the counter-clockwise direction in FIG. 8.

Figure 8B:
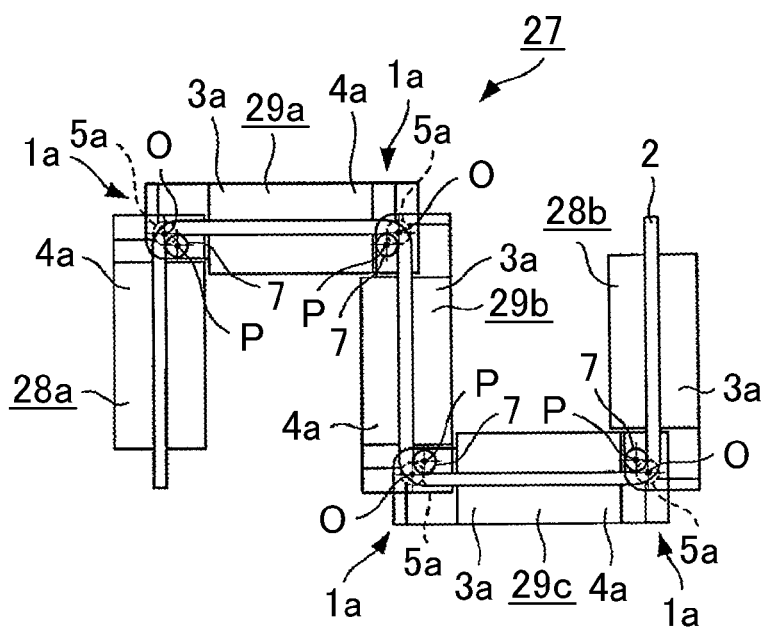

When the material 2 is bent by the bending machine 27, the material 2 is arranged at the jigs 28*a*, 28*b*, 29*a*, 29*b*, and 29*c*, and then the jigs 28*a*, 28*b*, 29*a*, 29*b*, and 29*c* are relatively rotated from the state shown in FIG. 8A to the state shown in FIG. 8B. As a result, the material 2 is bent at four portions to form a substantially S shape. It is to be noted that, as the bending apparatuses structuring the jigs 28*a*, 28*b*, 29*a*, 29*b*, and 29*c*, the bending apparatus 1*b* according to the second embodiment described above may be adopted. The number of the portions at which the material 2 is bent can be adjusted by increasing or decreasing the number of the intermediate jigs. Further, the position at which the material 2 is bent can also be adjusted by changing the length of the intermediate jigs.

A bending machine 27*a* including a mechanism for relatively rotating the jigs 28*a*, 28*b*, 29*a*, 29*b*, and 29*c* as described above is described referring to FIGS. 9 to 12. The bending machine 27*a* includes a base 30, a fixed attachment member 31 fixed to the base 30, a slider mechanism 32 movable in X and Y directions perpendicular to each other (i.e., forming a right angle therebetween) on the plane parallel to the surface of the base 30, and a movable attachment member 33 provided at a movable portion of the slider mechanism 32.

The fixed attachment member 31 is arranged so that the end jig 28*a* is attached to be oriented in the Y direction. The slider mechanism 32 includes a first rail member 34 arranged in the X direction, a second rail member 35 arranged in the Y direction, a first moving element 36 movable on the first rail member 34, and a second moving element 37 movable on the second rail member 35. The movable attachment member 33 is fixed to the first moving element 36. The first rail member 34 is fixed to the second moving element 37. The movable attachment member 33 is arranged so that the end jig 28*b* is attached to be oriented in the Y direction. Thus, the movable attachment member 33 is displaceable in the X and Y directions while the end jig 28*b* is kept oriented in the Y direction.

To the fixed attachment member 31 and the movable attachment member 33, the end jigs 28*a* and 28*b* are respectively attached to be oriented in the Y direction. Among the intermediate jigs 29*a*, 29*b* and 29*c*, the midmost intermediate jig 29*b* can be driven to rotate by a turntable 38. To this end, a pivot 40 provided for the intermediate jig 29*b* is loose fitted displaceably into a long hole 39 formed on the turntable 38 in the radial direction. The rotary center of the turntable 38 is set to coincide with the rotary center of the end jig 28*a* and the intermediate jig 29*a*. Alternatively, the long hole 39 may be arranged on the intermediate jig 29*b* side and the pivot 40 may be arranged on the turntable 38 side.

Figure 10:
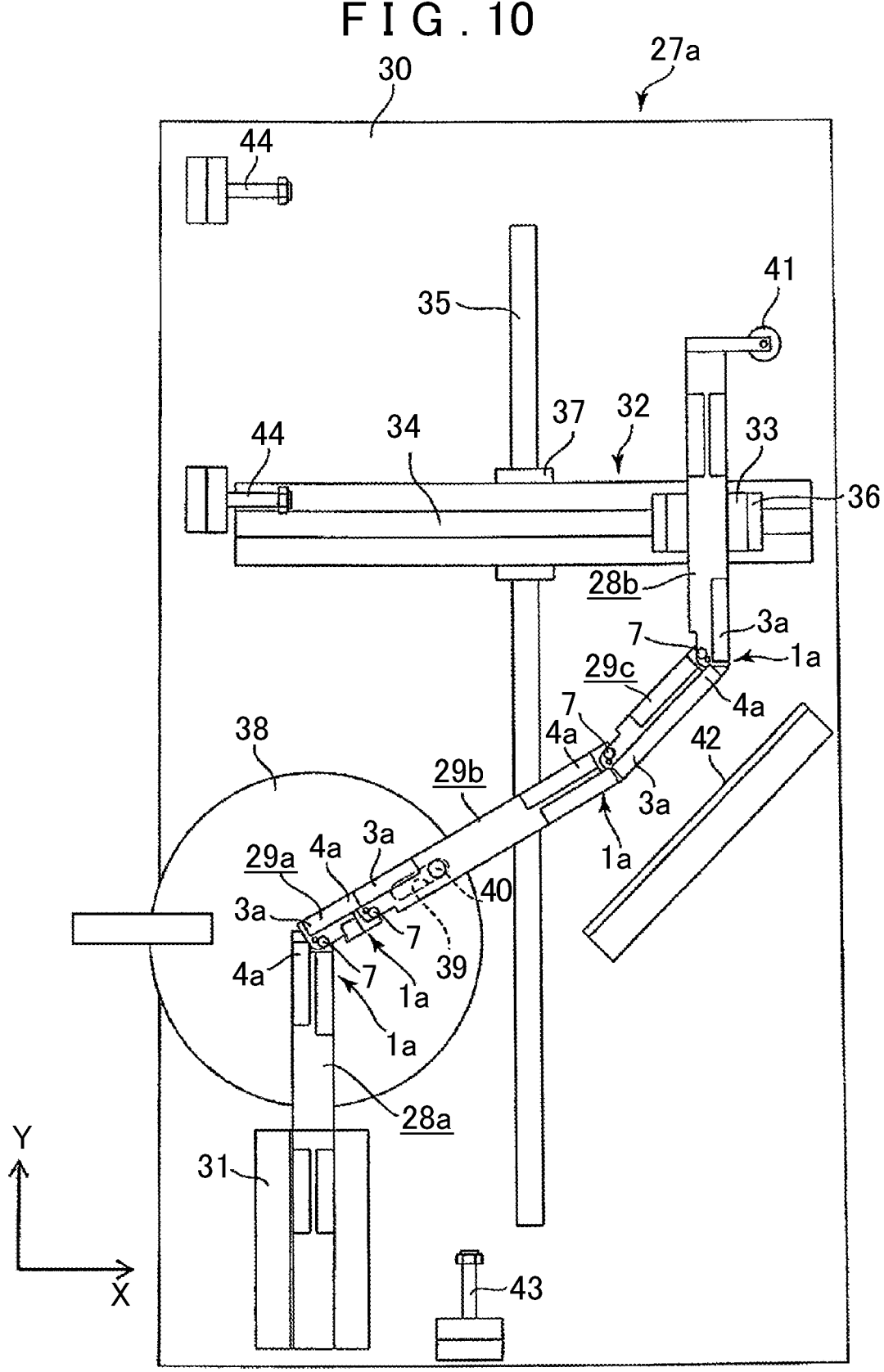
FIG. 10 is an elevation view showing the bending machine according to the third embodiment in the process of the bending.

When the bending is performed, as shown in FIG. 9, the material 2 is arranged at the jigs 28*a*, 28*b*, 29*a*, 29*b*, and 29*c*. Allowing the turntable 38 to rotate from this state, the intermediate jig 29*b* starts to rotate about the rotary center of the end jig 28*a* and the intermediate jig 29*a*, based on the engagement of the long hole 39 and the pivot 40. Then, as shown in FIGS. 10 to 12, while the end jig 28*b* is kept oriented in the Y direction, the jigs 28*a*, 28*b*, 29*a*, 29*b*, and 29*c* relatively rotate.

Figure 11:
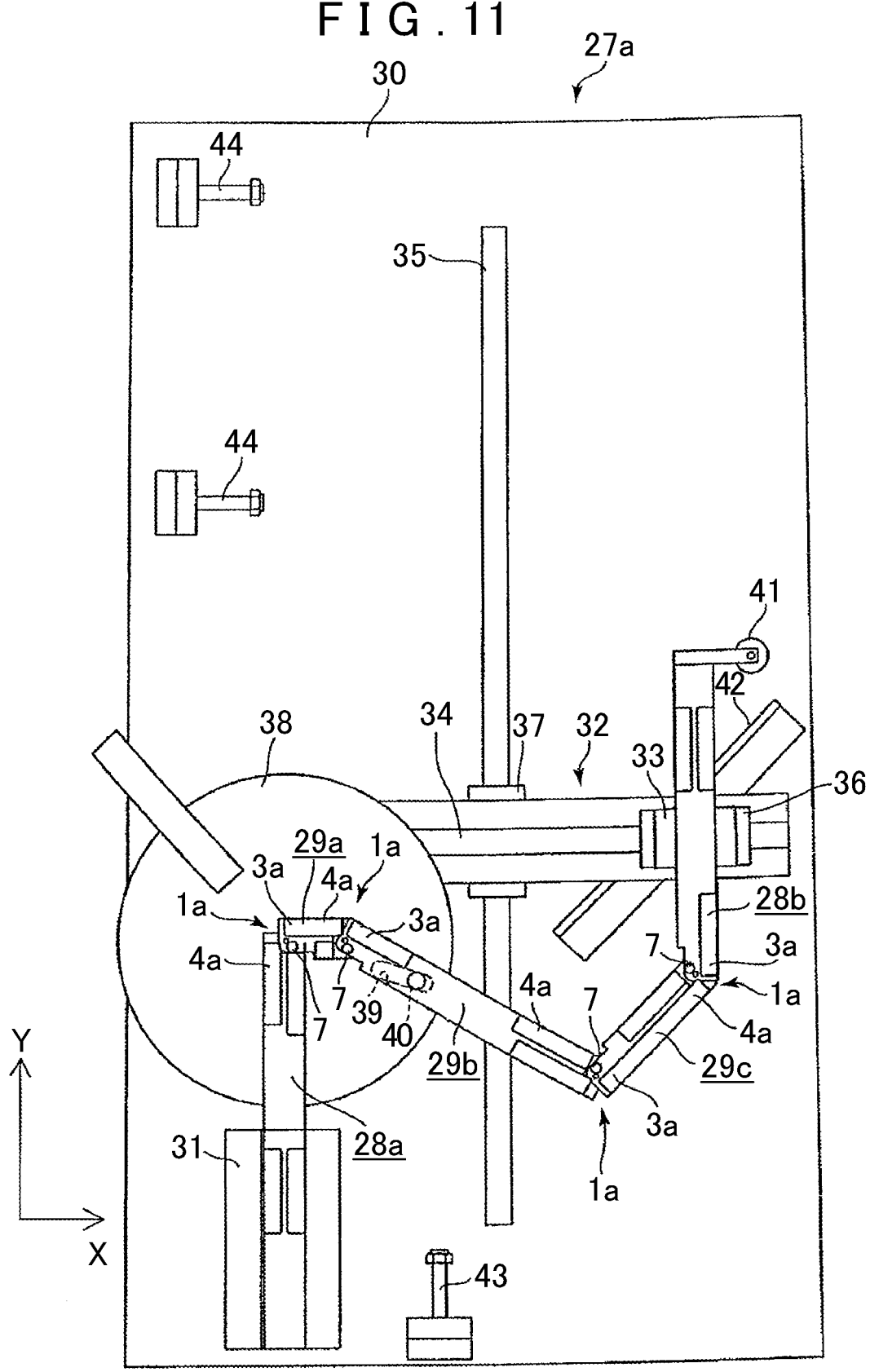
FIG. 11 is an elevation view showing the bending machine according to the third embodiment in a state where the material is further bent from the state shown in FIG. 10.
Figure 12:
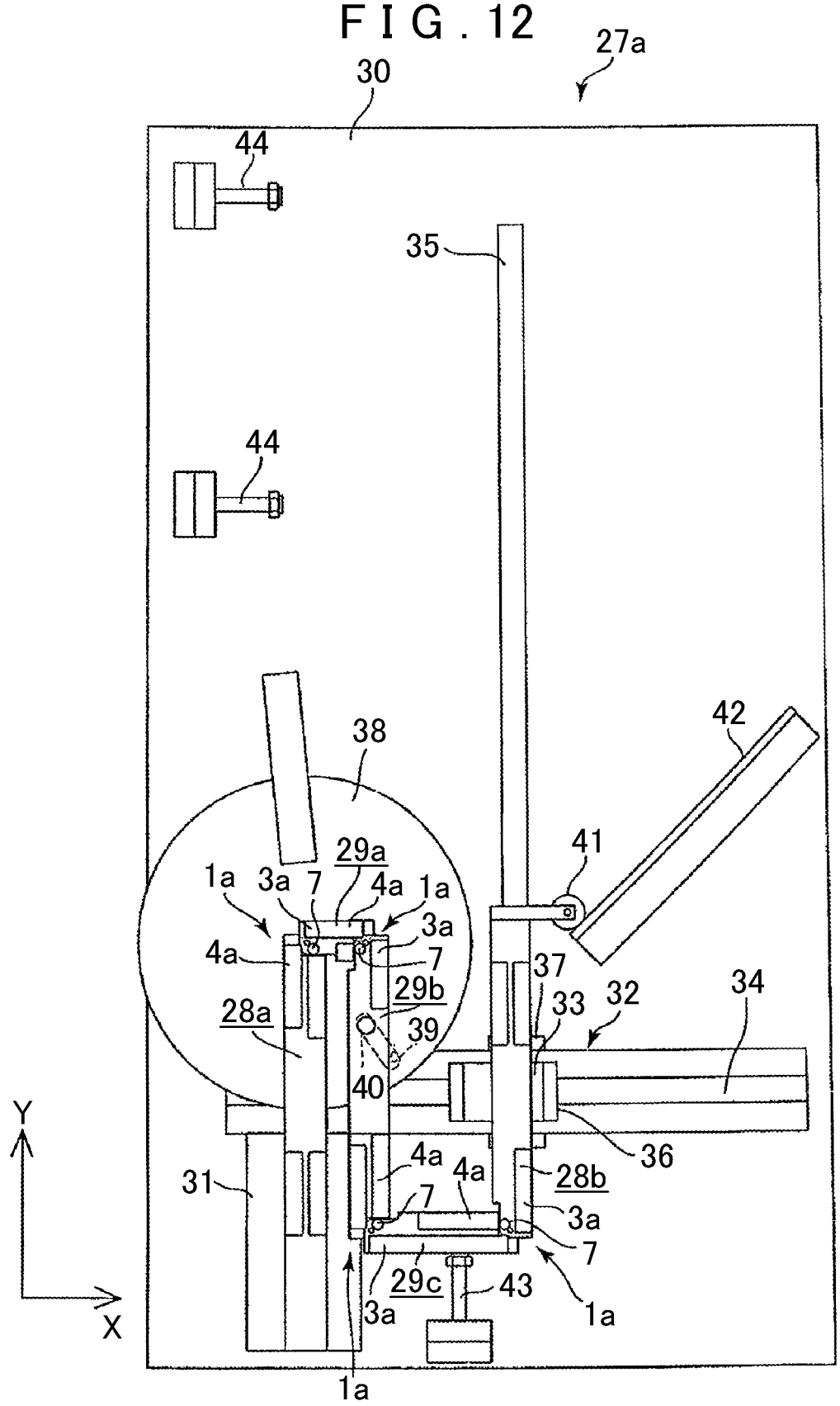
FIG. 12 is an elevation view showing the bending machine according to the third embodiment after the bending.

Here, as shown in the states from FIG. 11 to FIG. 12, a roller 41 arranged at the end jig 28*b* is engaged with a wall surface 42 arranged on the base 30 and inclined in the Y direction, so that the end jig 28*b* smoothly moves to a predetermined position. Then, as shown in FIG. 12, the rotary motion is finished in the state where the intermediate jig 29*c* abuts on a stopper 43 provided at a portion adjacent to the fixed attachment member 31 on the base 30. As a result, the material 2 can simultaneously be bent at four portions by 90 degrees each. It is to be noted that, as shown in FIG. 9B, the jigs 28*a*, 28*b*, 29*a*, 29*b*, and 29*c* are linearly arranged in the state where the end jig 28*b* and the intermediate jig 29*c* abut on additional stoppers 44 and 44 provided on the base 30.

According to the present embodiment being structured and functioning as described above, the material 2 can simultaneously be bent at four portions and, therefore, any complicated bending shapes can be achieved accurately and in a short time, thereby reducing the manufacturing costs. That is, because each of the bending apparatuses 1*a* structuring the bending machine 27*a* does not cause pull-in of the material 2 when bending is performed, the material 2 is not be pulled even when the material 2 is simultaneously bent at four portions. Accordingly, the dimension of the material 2 does not change even when the material 2 is simultaneously bent at four portions, and any complicated bent shapes can be obtained accurately and in a short time.

Figure 14:
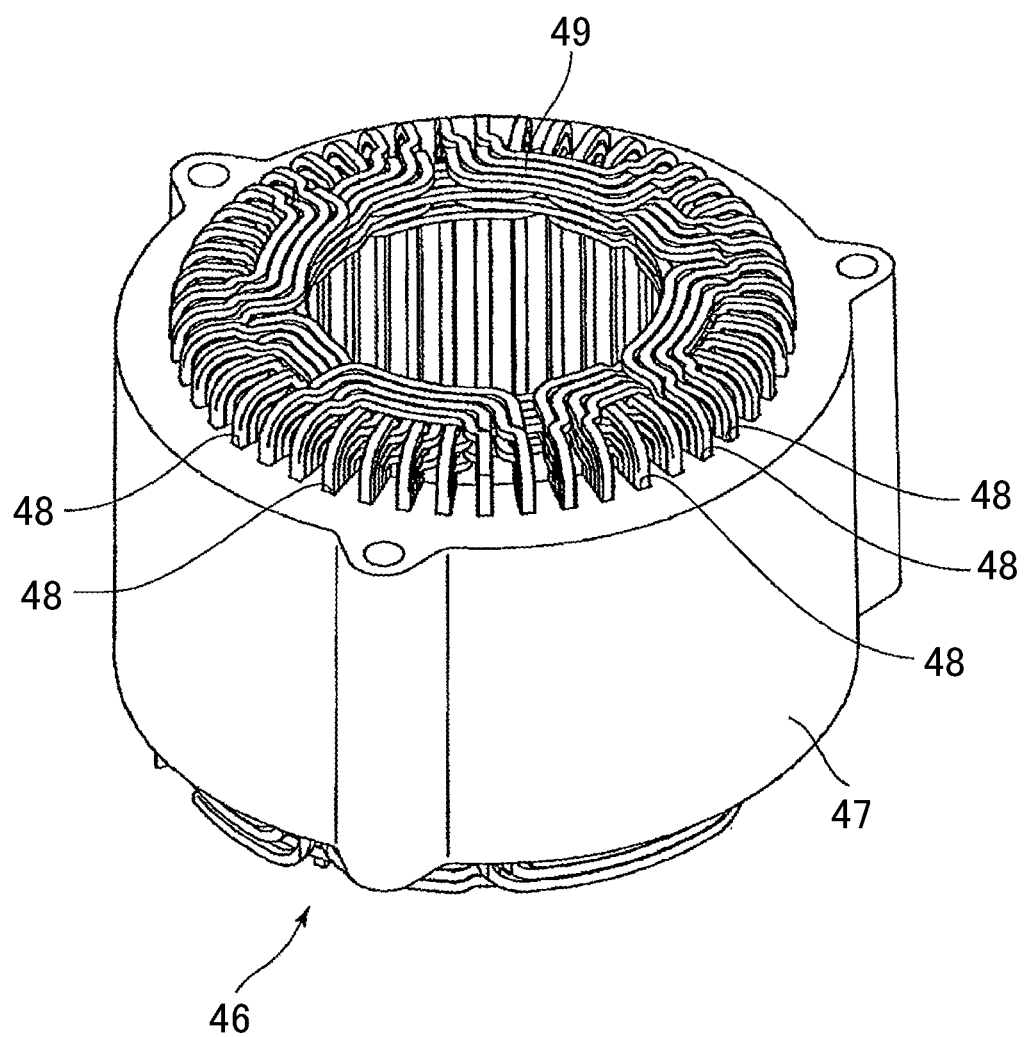
FIG. 14 is a perspective view of a stator where the coil elements obtained by the present invention are used.

By repeating the bending of the material 2 as described above for a plurality of times, for example, a corrugated coil element 45 as shown in FIG. 13 can be obtained. Such a corrugated coil element 45 is used for, for example, a stator 46 shown in FIG. 14. The stator 46 is briefly described. The stator 46 is used in a motor, and structured by arranging coils 49 of three U, V, and W phases each formed by a plurality of stacked coil elements 45 into slots 48 and 48 formed in a plurality of portions at the inner peripheral surface of a cylindrical stator core 47. Generally, when structuring the stator 46, before being arranged in the stator core 47, a plurality of the coil elements 45 are stacked to form the coils 49, and thereafter the coils 49 are arranged in the stator core 47 using an insert jig. In some cases, however, a plurality of the coil elements 45 are arranged in the stator core 47, and in that state the coil elements 45 are joined by welding or the like.

According to the present embodiment, since the number of the bent portions of the coil elements 45 formed can be increased, the joining portions of the coil elements 45 can be reduced, thereby reducing the manufacturing costs. Also, with reduced joining portions, intervals between coil elements 45 can be shortened, thereby reducing the size of the coils 49.

The bending apparatus and the bending machine according to the present invention can be used to form motor coils, and in particular, are suitable for performing a complicated bending such as of motor coils for a hybrid vehicle.

What is claimed is:

1. A bending apparatus that includes a first jig and a second jig coupled so as to be rotatable about a rotary shaft, and that bends a prescribed material attached to the first jig and the second jig as the first and second jigs rotate relatively to each other about the rotary shaft, wherein
the first jig rotates about the rotary shaft, and has a suppressing section that is arranged on a side opposite to a rotating direction and suppresses a displacement of the material, and a bending section that is arranged offset by a prescribed amount from a center axis of the rotary shaft to a rotating side of the material, and has a partially cylindrical surface having a radius of curvature substantially identical with a radius of curvature of an inner peripheral surface of the material at least after the bending of the material,
the second jig rotates about the rotary shaft, and has a suppressing section that is arranged on the side opposite to the rotating direction and suppresses the displacement of the material, and
a bending center of the material is arranged at a position that is distant from the center axis of the rotary shaft of the first and second jigs toward the rotating side so that the material is not displaced relative to the first and second jigs when the material is bent,
wherein the bending apparatus is configured to have a positional relationship between the rotary shaft, the bending section and the suppressing section such that before the bending:
(a-1) the bending section is arranged so that the material is held between the bending section and the suppressing section; and
(a-2) a center of curvature of the partially cylindrical surface of the bending section is arranged to be offset by a prescribed amount from the center axis of the rotary shaft toward the rotating side of the material, and
wherein after the bending the center of curvature of the partially cylindrical surface of the bending section coincides with the bending center.

2. The bending apparatus according to claim 1, wherein the bending section moves so that
the bending section before the bending is positioned on a first jig side relative to a perpendicular line that is perpendicular to the first and second jigs in a linear state and passes through the rotary center, and
the bending section after the bending is positioned on a second jig side relative to the perpendicular line.

3. The bending apparatus according to claim 1, wherein the bending center of the material is arranged at a position satisfying expressions:

$$X = (R + W \times a) \times \theta / 2 / \tan(\theta/2)$$

$$Y = (R + W \times a) \times \theta / 2$$

$$0 < \theta \leq \pi/2$$

where $\theta$ is a bending angle of the material; W is a thickness or diameter of the material; a is a ratio of a distance between a neutral line of the material and the inner peripheral surface of the material after the bending of the material to W; R is a radius of curvature of a cylindrical surface of the bending section; and of a distance from the bending center to the rotary center of the first and second jigs, X is a distance related to a direction perpendicular to a linear direction assuming that a state of the material before the material is bent in a bending direction is linear, and Y is a distance related to a direction parallel to the linear direction based on the same assumption.

4. The bending apparatus according to claim 1, wherein the prescribed material is a flat rectangular wire forming a motor coil.

5. A bending machine, wherein
a plurality of the bending apparatuses according to claim 1 are arranged in series by coupling the first jigs and the second jigs alternately at the rotary centers, so as to bend the prescribed material at a plurality of portions.

6. The bending machine according to claim 5, further comprising:
a base;
a fixed attachment member fixed to the base;
a slider mechanism movable in an X direction and a Y direction perpendicular to each other on a plane parallel to a surface of the base; and
a movable attachment member provided at a movable portion of the slider mechanism, wherein
five jigs are arranged in series by coupling the first jigs and the second jigs alternately,
one of the five jigs arranged in series, which is located at one end thereof, is attached to the fixed attachment member, and one of the five jigs arranged in series, which is located at the other end thereof, is attached to the movable attachment member, and
the jig at the other end is moved in the X and Y directions while being kept oriented in the same direction before and after the bending, so that the material is bent simultaneously at four portions.

7. The bending machine according to claim 6, wherein the material is bent by applying a bending force to one of the five jigs arranged in series, which is located in the middle.

8. The bending machine according to claim 6, wherein the fixed attachment member is arranged so that
the jig at the one end is attached to be oriented in the Y direction, the movable attachment member is arranged so that the jig at the other end is attached to be oriented in the Y direction, and the material is bent by 90 degrees each.

* * * * *